(12) United States Patent
Swaminathan et al.

(10) Patent No.: US 12,271,675 B2
(45) Date of Patent: Apr. 8, 2025

(54) LOCATION-AWARE PROTECTION SYSTEM OF LATCHES (LAPS-L)

(71) Applicant: INTERNATIONAL BUSINESS MACHINES CORPORATION, Armonk, NY (US)

(72) Inventors: Karthik V Swaminathan, Mount Kisco, NY (US); Alper Buyuktosunoglu, White Plains, NY (US); Pradip Bose, Yorktown Heights, NY (US); Bulent Abali, Tenafly, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 562 days.

(21) Appl. No.: 17/647,679

(22) Filed: Jan. 11, 2022

(65) Prior Publication Data

US 2023/0222279 A1 Jul. 13, 2023

(51) Int. Cl.
*G06F 30/398* (2020.01)
*G06F 30/392* (2020.01)
*G06F 119/12* (2020.01)
*H03M 13/27* (2006.01)

(52) U.S. Cl.
CPC .......... *G06F 30/398* (2020.01); *G06F 30/392* (2020.01); *H03M 13/27* (2013.01); *G06F 2119/12* (2020.01)

(58) Field of Classification Search
CPC .............................. G06F 30/398; G06F 30/392
USPC ........................................................ 716/112
See application file for complete search history.

(56) References Cited

U.S. PATENT DOCUMENTS

| 7,774,732 | B2 | 8/2010 | Kleinosowski et al. |
| 7,795,900 | B1 | 9/2010 | Lesea et al. |
| 8,171,386 | B2 | 5/2012 | Chandra et al. |
| 8,271,912 | B2 * | 9/2012 | Ellavsky ............... G06F 30/327 716/101 |
| 8,468,484 | B2 | 6/2013 | Lilja |

(Continued)

FOREIGN PATENT DOCUMENTS

| CN | 104409103 A | 3/2015 |
| WO | 2014066402 A1 | 5/2014 |

OTHER PUBLICATIONS

Kim et al., "All-inclusive ECC: Thorough end-to-end protection for reliable computer memory", 2016 ACM/IEEE 43rd Annual International Symposium on Computer Architecture (ISCA), 2016, pp. 622-633, doi: 10.1109/ISCA.2016.60, (12 pages).

(Continued)

*Primary Examiner* — Jack Chiang
*Assistant Examiner* — Suchin Parihar
(74) *Attorney, Agent, or Firm* — Shackelford, McKinley & Norton, LLP

(57) ABSTRACT

Embodiments for providing enhanced location-aware protection of latches in a computing environment are provided. One or more latches are combined in one or more of a plurality of bounding boxes on a two-dimensional circuit design layout based on one or more rules. A location-aware interleaving of error correction codes ("ECC") and burst error correction codes may be selectively applied to one or more latches in those of the plurality of bounding boxes, where multiple bit errors are corrected.

20 Claims, 9 Drawing Sheets

(56) References Cited

U.S. PATENT DOCUMENTS

| | | | |
|---|---|---|---|
| 8,972,819 B2* | 3/2015 | Morris | G06F 11/186 |
| | | | 714/764 |
| 9,268,637 B2* | 2/2016 | Gifford | G06F 11/1068 |
| 9,985,656 B2 | 5/2018 | Jeganathan et al. | |
| 10,365,327 B2 | 7/2019 | Bose et al. | |
| 10,930,646 B2* | 2/2021 | Chang | H01L 23/528 |
| 2008/0120525 A1* | 5/2008 | Agarwal | G01R 31/318541 |
| | | | 714/E11.159 |
| 2009/0049418 A1* | 2/2009 | KleinOsowski | G06F 30/392 |
| | | | 716/119 |
| 2009/0241073 A1* | 9/2009 | Ellavsky | G06F 30/396 |
| | | | 716/132 |
| 2009/0249301 A1 | 10/2009 | Kalla et al. | |
| 2013/0162293 A1* | 6/2013 | Lilja | H03K 21/10 |
| | | | 716/121 |
| 2016/0373158 A1* | 12/2016 | Ardalan | H04B 7/0413 |
| 2017/0063401 A1 | 3/2017 | Jeganathan et al. | |
| 2021/0247441 A1 | 8/2021 | Autie et al. | |
| 2023/0308182 A1* | 9/2023 | Frankel | H04B 10/118 |
| 2024/0054046 A1* | 2/2024 | Khayat | G11C 29/08 |
| 2024/0071521 A1* | 2/2024 | Nguyen | G11C 16/32 |
| 2024/0071544 A1* | 2/2024 | Zainuddin | G11C 29/52 |
| 2024/0104282 A1* | 3/2024 | Trombley | G06F 30/392 |

OTHER PUBLICATIONS

Arbel et al., "Automated detection and verification of parity-protected memory elements", ICCAD '14: Proceedings of the 2014 IEEE/ACM International Conference on Computer-Aided Design, Nov. 2014, (8 pages).

Maniatakos et al., "Vulnerability-based interleaving for multi-bit upset (MBU) protection in modern microprocessors", 2012 IEEE International Test Conference, 2012, pp. 1-8, doi: 10.1109/TEST.2012.6401594, (8 pages).

Paul et al., "Reliability-Driven ECC Allocation for Multiple Bit Error Resilience in Processor Cache," in IEEE Transactions on Computers, vol. 60, No. 1, pp. 20-34, Jan. 2011, doi: 10.1109/TC.2010.203, (15 pages).

Shi et al., "Interleaving for combating bursts of errors," in IEEE Circuits and Systems Magazine, vol. 4, No. 1, pp. 29-42, 2004, doi: 10.1109/MCAS.2004.1286985, (14 pages).

Lilja et al., "Single-Event Performance and Layout Optimization of Flip-Flops in a 28-nm Bulk Technology," in IEEE Transactions on Nuclear Science, vol. 60, No. 4, pp. 2782-2788, Aug. 2013, doi: 10.1109/TNS.2013.2273437, (7 pages).

Das et al., "Low Complexity Burst Error Correcting Codes to Correct MBUs in SRAMs" Proceedings of the 2018 on Great Lakes Symposium on VLSI, 219-224, 2018, (6 pages).

* cited by examiner

LOCATION-AWARE PROTECTION SYSTEM OF LATCHES (LAPS-L)

BACKGROUND

The present invention relates in general to computing systems, and more particularly, to various embodiments for providing enhanced location-aware protection of latches in a computing system using a computing processor.

SUMMARY

According to an embodiment of the present invention, a method for providing enhanced location-aware protection of latches ("LAPS-L") in a computing environment, by one or more processors, is depicted. One or more latches are combined in one or more of a plurality of bounding boxes on a circuit design layout based on one or more rules. A location-aware interleaving of error correction codes ("ECC") and burst error correction (BEC) codes may be selectively applied to one or more latches in those of the plurality of bounding boxes, where physically adjacent multiple bit errors, for example caused by high energy particles, are corrected.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

DETAILED DESCRIPTION OF THE DRAWINGS

Figure 1:
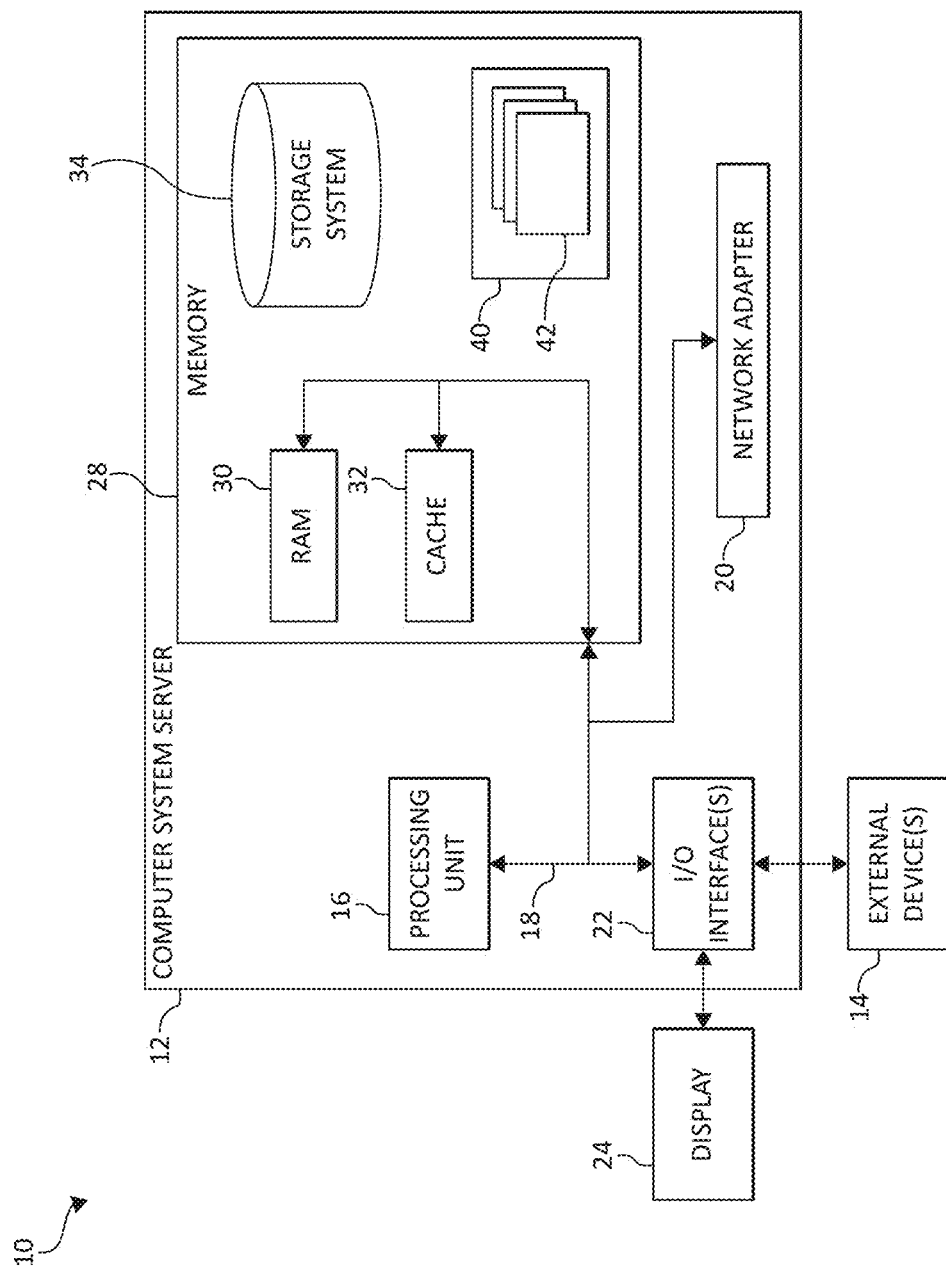
FIG. 1 is a block diagram depicting an exemplary cloud computing node according to an embodiment of the present invention.

As integrated circuits continue to be made smaller many new dependability issues are becoming increasingly important. For example, it has long been known that bit-flip errors in integrated circuits can be caused by alpha particles and by cosmic radiation comprising of high-energy protons and neutrons. As the size of integrated circuits become smaller radiation-induced faults, such as single-event upsets (SEUs) and multi-bit upsets (MBUs), are becoming more common. An SEU or MBU can occur when a particle passes through an integrated circuit. Upon impacting an integrated circuit, the particle may convert its kinetic energy to electrical energy which can be deposited in the circuitry. This energy can affect the state of the circuitry, for example erroneously flipping a bit, if the deposited energy exceeds the energy level which is required to hold the correct logical state. An SEU occurs when a particle changes the state of a single circuit element and an MBU occurs when a particle changes the state of two or more circuit elements.

Cosmic rays and other common radiation types can result in SEUs and MBUs in integrated circuits. As integrated circuits continue to decrease in size, lower energies are needed to change the internal state of the circuitry. Accordingly, probability of multiple bit errors increases as circuit sizes decrease. Moreover, the radiation emitting materials, such as lead and lead alloys, can cause memory malfunctions and errors in the electronic circuits and other components in the integrated circuit packages. Protection against radiation from external sources is accomplished through shielding and other various protection mechanisms, but protection against radiation from radioactive source within an integrated circuit package remains challenging. Therefore, radiation-induced faults are becoming a reliability concern for modern integrated circuits.

Accordingly, various implementations of the present invention provide for enhanced location-aware protection of latches ("LAPS-L") in a computing environment is depicted. One or more latches are combined in one or more of a plurality of bounding boxes on a circuit design layout based on one or more rules. A location-aware interleaving of error correction codes ("ECC") and a burst error correction code may be selectively applied to one or more latches in those of the plurality of bounding boxes, where multiple bit errors are corrected. A latch is a memory cell, a register, storing a single bit of information.

It should be noted that error-correcting code (ECC) is an encoding scheme that transmits messages as binary numbers, in such a way that the message can be recovered even if some bits are erroneously flipped. A redundant set of bits, i.e., redundant information, are added to the message so that the original message may be recovered even if some small number of message bits are erroneously flipped. For example, additional memory cells and latch devices are added to memory arrays and latches in integrated circuit packages to provide ECC memory data storage, where the ECC bits are used to detect and correct soft errors. The redundant set of bits added to the message are sometimes called "parity bits" or "check bits". In some examples, latches are also "hardened" against soft errors by increasing the transistor sizes of the latch devices, which helps prevent the interacting radiation particles from causing the latch to flip when hit with a sub-atomic particle. Also note that "interleaving" means that adjacent (logically or physically) information bits may be encoded with separate ECC codes. Therefore, adjacent multiple errors may be logically converted into uncorrelated single errors, each of which is then corrected with a simpler single-bit error correcting code (also called SECDED or "SEC/DED" in prior art).

Also, it should be noted that an "ECC field" is a combination of different bits in the word XOR-ed (the logical exclusive-OR function) together so that errors (erroneous bit flips in the data word) can be easily detected, pinpointed, and corrected. The number of errors that can be detected and corrected is directly related to the length of the ECC field appended to the data word. One goal is to ensure a minimum separation distance between valid data words and code word combinations. The greater the number of errors being detected and corrected, the longer the ECC field required to ensure minimum separation distance between valid code words. This distance between valid code words is known as the Hamming distance.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as used herein, "optimize" (or used interchangeable with the word "enhanced") may refer to and/or defined as "maximize," "minimize," "best," or attain one or more specific targets, objectives, goals, or intentions. Optimize may also refer to maximizing a benefit to a user (e.g., maximize a trained machine learning scheduling agent benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations, schedules, PE's, and/or machine learning models/machine learning pipelines, but there may be a variety of factors that may result in alternate suggestion of a combination of operations, schedules, PE's, and/or machine learning models/machine learning pipelines yielding better results. Herein, the term "optimize" may refer to such results based on minima (or maxima, depending on what parameters are considered in the optimization problem). In an additional aspect, the terms "optimize" and/or "optimizing" may refer to an operation performed to achieve an improved result such as reduced execution costs or increased resource utilization, whether the optimum result is actually achieved. Similarly, the term "optimize" may refer to a component for performing such an improvement operation, and the term "optimized" may be used to describe the result of such an improvement operation.

It is understood in advance that although the present invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
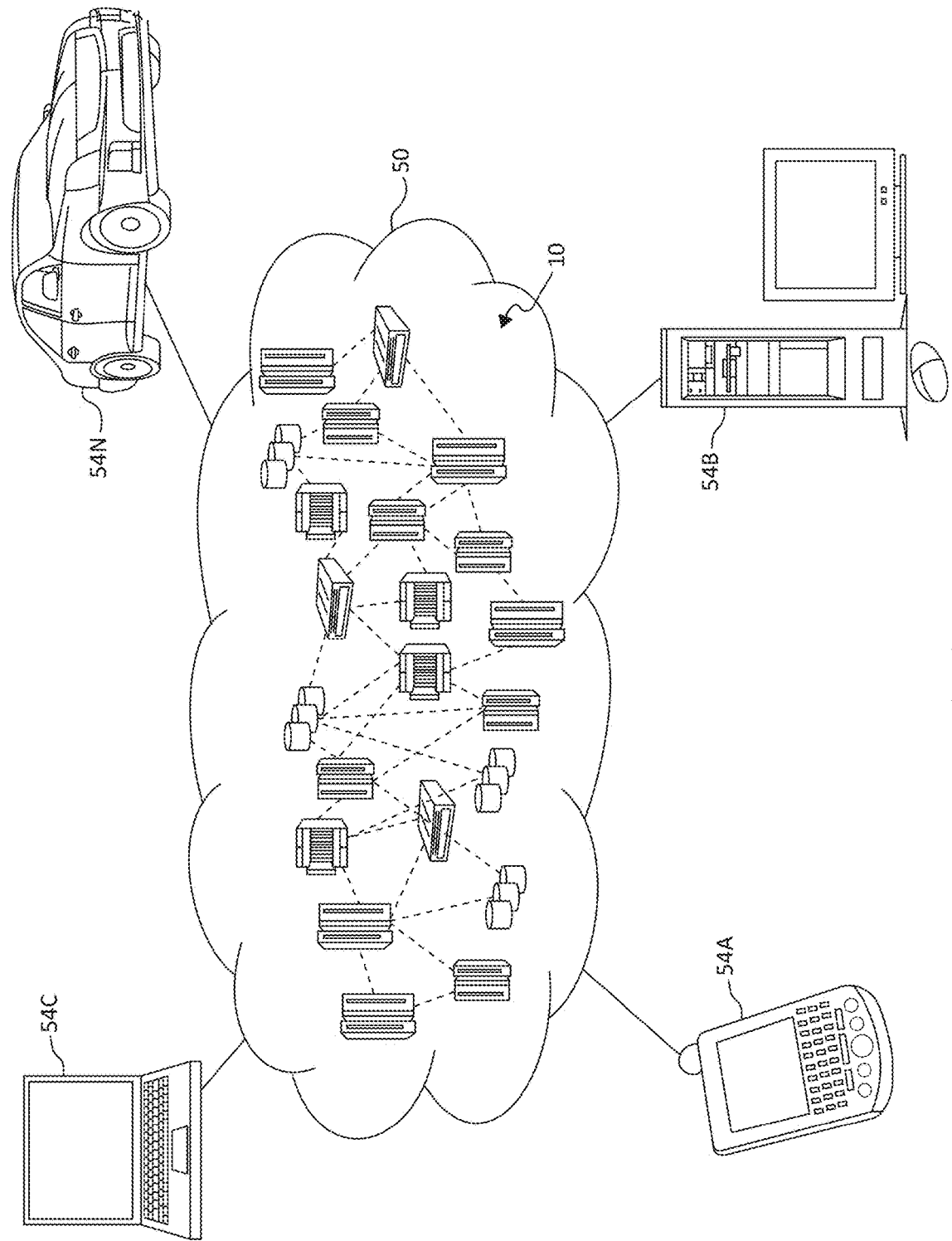
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
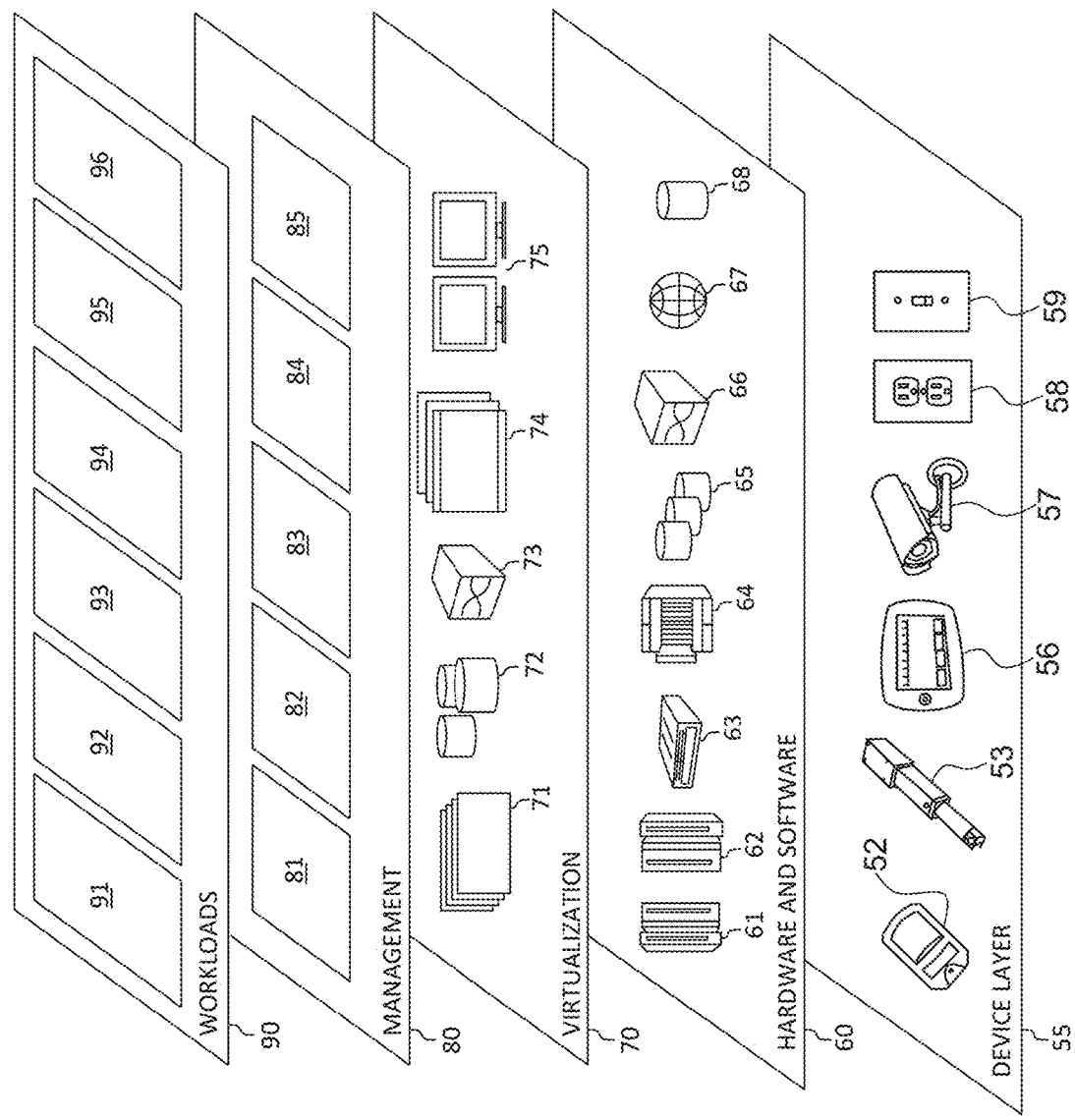
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing enhanced location-aware protection of latches ("LAPS-L") in a computing environment (e.g., in a neural network architecture). In addition, workloads and functions 96 for providing enhanced location-aware protection of latches in a computing environment may include such operations as interleaving and as will be further described, user and device management functions. One of ordinary skill in the art will appreciate that the workloads and functions 96 for providing enhanced location-aware protection of latches in a computing environment may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing enhanced location-aware protection of latches ("LAPS-L") in a computing environment, by one or more processors. A design tool identifies physically nearby latches susceptible to multiple bit errors, automatically inserts redundant latches for enabling error detecting and correcting codes, synthesizes interleaved error detecting and correcting codes and/or burst-error-correcting codes to the result of eliminating system failures due to multiple latch flips caused by alpha particles, cosmic rays, and other localized sources of failure. Redundant latches are "parity bits/check bits" used for enabling error detection and correction codes. Redundant latches contain sufficient redundant information derived from the original set of latches such that the erroneously flipped latches may be identified and the original information may be recovered despite the errors. To protect against multiple bit errors, an increasing number of redundant latches may be required; therefore, increasing the cost of circuitry. Interleaving means that adjacent information bits may be encoded with separate ECC words. Multiple adjacent errors may be logically converted into uncorrelated single errors, each of which is then corrected with a simpler single bit correcting ECC word (e.g., SECDEC or "SEC/DEC").

In some implementations, one or more latches are combined in one or more of a plurality of bounding boxes on a circuit design layout based on one or more rules. A location-aware interleaving of error correction codes ("ECC") and burst error correction codes may be selectively applied to one or more latches in those of the plurality of bounding boxes, where multiple bit errors are corrected.

Figure 4:
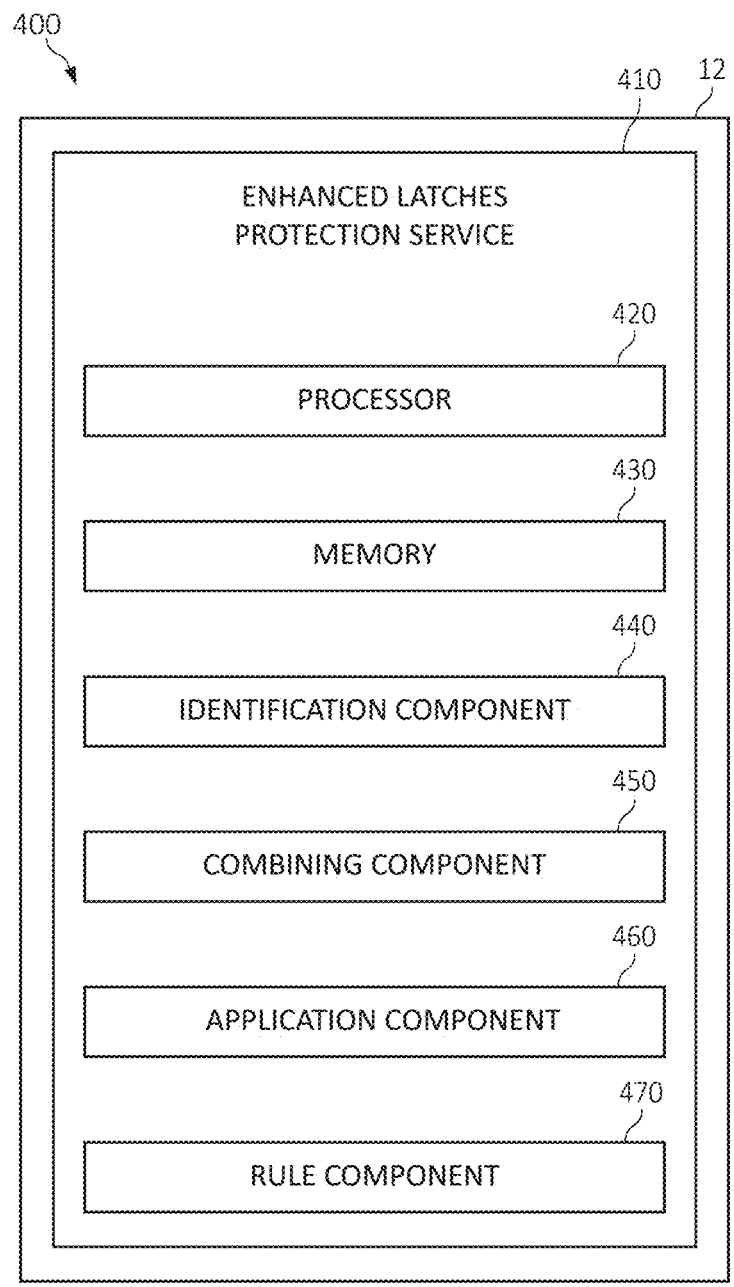
FIG. 4 is an additional block diagram depicting an exemplary functional relationship between various aspects of the present invention.

Turning now to FIG. 4, a block diagram depicting exemplary functional components of system 400 for providing enhanced location-aware protection of latches ("LAPS-L") in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

An enhanced latches protection service 410 is shown, incorporating processing unit 420 ("processor") to perform various computational, data processing and other functionality in accordance with various aspects of the present invention. In one aspect, the processor 420 and memory 430 may be internal and/or external to the enhanced latches protection service 410, and internal and/or external to the computing system/server 12. The enhanced latches protection service 410 may be included and/or external to the computer system/server 12, as described in FIG. 1. The processing unit 420 may be in communication with the memory 430. The enhanced latches protection service 410 may include an identification component 440, a combining component 450, an application component 460, and a rule component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

The enhanced latches protection service 410 may, using the identification component 440, the combining component 450, the application component 460, the rule component 470, or a combination thereof, combine one or more latches in one or more of a plurality of bounding boxes on a circuit design layout based on one or more rules; and selectively apply a location-aware interleaving of error correction codes ("ECC") and burst error correction codes to one or more latches in those of the plurality of bounding boxes, wherein multiple bit errors are corrected.

The enhanced latches protection service 410 may, using the identification component 440, the combining component 450, the application component 460, the rule component 470, or a combination thereof, apply a two-dimensional ("2D") template having the plurality of bounding boxes to the circuit design layout having the one or more latches.

The enhanced latches protection service 410 may, using the identification component 440, the combining component 450, the application component 460, the rule component 470, or a combination thereof, identify a maximum strike radius, across all sources of radiation, for each of the plurality of bounding boxes.

The enhanced latches protection service 410 may, using the identification component 440, the combining component 450, the application component 460, the rule component 470, or a combination thereof identify a set of latches in each ECC word based on the location-aware interleaving of latches.

The enhanced latches protection service 410 may, using the identification component 440, the combining component 450, the application component 460, the rule component 470, or a combination thereof prevent the one or more latches from sharing a same boundary box of the plurality of bounding boxes based on the location-aware interleaving.

The enhanced latches protection service 410 may, using the identification component 440, the combining component 450, the application component 460, the rule component 470, or a combination thereof combine a set of functionally different latches having a similar clock sequence.

The enhanced latches protection service 410 may, using the identification component 440, the combining component 450, the application component 460, the rule component 470, or a combination thereof overlap one or more boundary boxes of the plurality of bounding boxes with one or more alternative boundary boxes of the plurality of bounding boxes, wherein overlapped boundary boxes ensure at least two latches are at least two boundary boxes apart.

Figure 5:
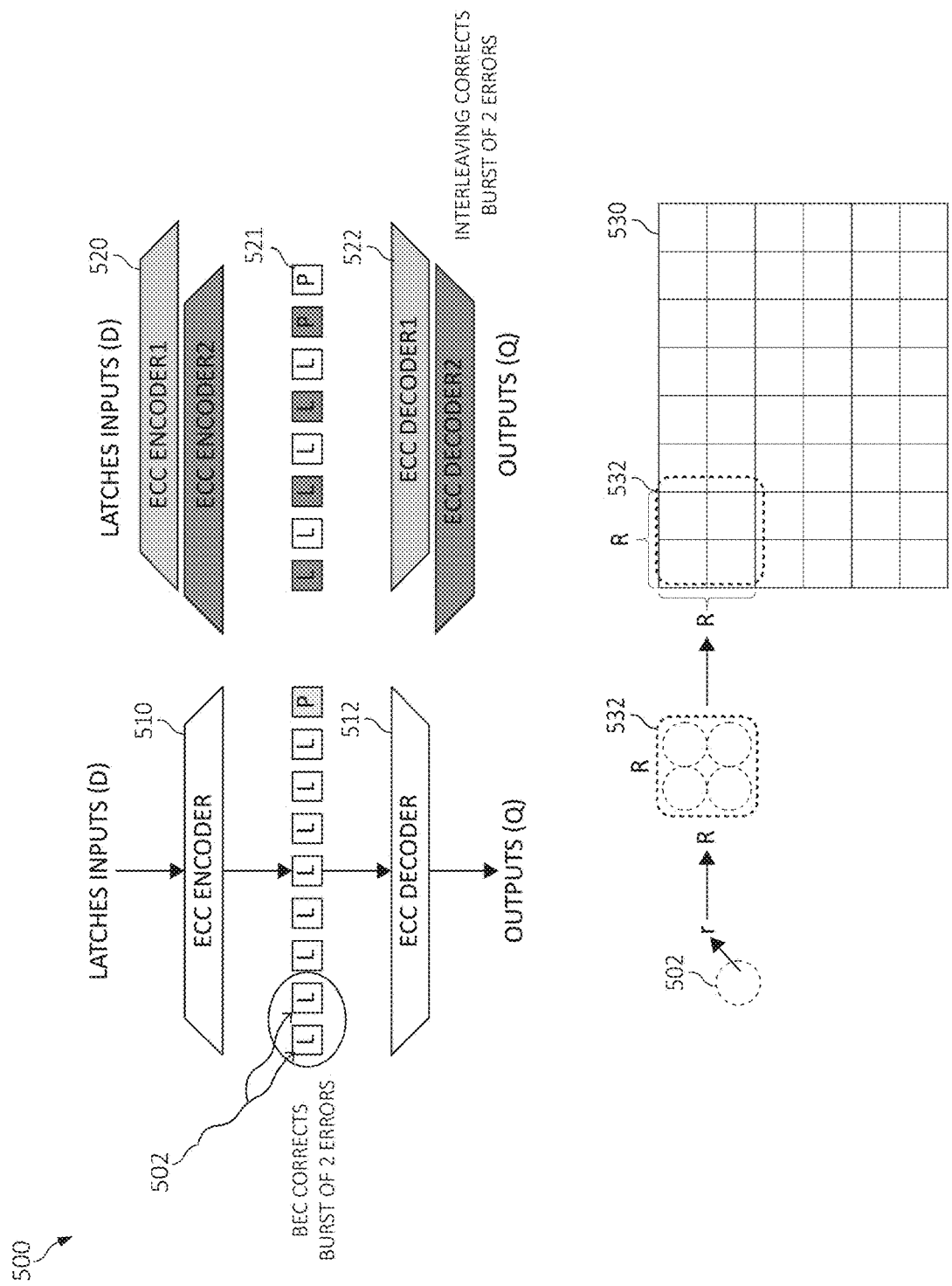
FIG. 5 is a block diagram depicting operations for providing enhanced location-aware protection of latches according to an embodiment of the present invention.

The enhanced latches protection service 410 may, using the identification component 440, the combining component 450, the application component 460, the rule component 470, or a combination thereof, identify physically nearby latches, automatically insert redundant latches, synthesize interleaved error detecting and correcting codes and, alternatively, burst-error-correcting codes to the result of eliminating system failures due to multiple latch flips caused by alpha particles, cosmic rays, and other localized sources of failure, as described herein For further explanation, FIG. 5 is a block diagram depicting operations for providing enhanced location-aware protection of latches according to an embodiment of the present invention. In one aspect, one or more of the components, modules, services, applications, and/or functions described in FIGS. 1-4 may be used in FIG. 5. As will be seen, many of the functional blocks may also be considered "modules" of functionality, in the same descriptive sense as has been previously described in FIGS. 1-4. Repetitive description of like elements employed in other embodiments described herein is omitted for sake of brevity.

With the foregoing in mind, the module blocks' of systems 500 may also be incorporated into various hardware and software components of a system integrating disaggregated memory in a cloud computing environment in accordance with the present invention. Many of the functional blocks of systems 500 may execute as background processes on various components, either in distributed computing components, or elsewhere.

As depicted, the system 500 depicts one or more latches ("L" and "P") being input into an error correction code ("ECC") encoder 510. "P" latches are the redundant set of latches, called parity or check bit latches, added to the circuitry to facilitate the ECC operation. However, particles 502 may strike multiple latches (e.g., one of the latches labeled as "L" or "P" and have the circle around them). With shrinking feature sizes of an integrated circuit down to 5 nanometers ("nm") and 3 nm, physically adjacent multiple latches may flip together due to the particle 502. The ECC encoder 510 may be capable of producing redundant information to be used later for correcting single bit errors and detecting double errors ("SEC/DED"). An ECC decoder 512 may decode the information in the latches, corrects any errors, and generates an output ("Q").

However, existing single-bit correcting ECC structures as shown in 510 and 512 may not be strong enough. Burst Error Correction codes may also be used in communication channels to correct consecutive bit errors. In the present invention, a two-dimensional ("2D") BEC code may be spatially applied instead of temporally to solve the foremoentioned problem.

In some implementations, interleaving is an error correction operation which may be combined with SECDED to correct adjacent errors, as depicted by two ECC encoders 520, logically interleaving the latches 521, and two ECC decoders 520 decoding the ECC on the latches ("L" and "P")) and generate outputs ("Q"). Interleaving indicates that physically adjacent bits on the chip may be encoded with separate ECC codes. Therefore, a burst of errors may be logically converted into uncorrelated single errors, which are then corrected with simpler ECC codes (e.g., SECDEC or "SEC/DEC").

In some implementations, to provide enhanced location-aware protection of latches, the present invention may identify the strike radius "r" of the high energy particle 502 and create a 2D template 530.

A location-aware ECC encoding is applied to latches in 2 dimensions (2D) to correct multiple bit errors. A placement tool (e.g., the enhanced latches protection service 410) may automate the ECC synthesis because the placement tool (e.g., the enhanced latches protection service 410) is aware of the two-dimensional X-Y coordinates of each latch in the computing system chip. A design tool (e.g., a design tool associated with or included in the enhanced latches protection service 410) may identify and obtain a maximum strike radius r of a high energy particle 502 from test sites, assuming multiple bits within the same radius r may erroneously flip together when hit by the particle.

The present invention (e.g., the enhanced latches protection service 410) may use that radius r to define the length R as being equal to four times radius r (e.g., length R=4r), the dimensions of an R×R bounding box 532 in nanometers. It should be noted that squares are used conservatively in FIG. 5 for an R×R bounding rather than circles to avoid calculating Euclidian distances, but circles may be used per design tool implementation choices.

If the circuits are susceptible in the X dimension, more than the Y dimension (or vice versa), the bounding box dimensions may be different, e.g., a non-square rectangle bounding box.

If certain regions of an integrated chip are more critical or susceptible than the other regions, then the strike region R×R can be increased to S×S such that S>R only in those critical regions, whereas the remaining less-critical regions of the chip may be tiled the with R-sided bounding boxes such as, for example, using the R×R bounding box 532.

Figure 6:
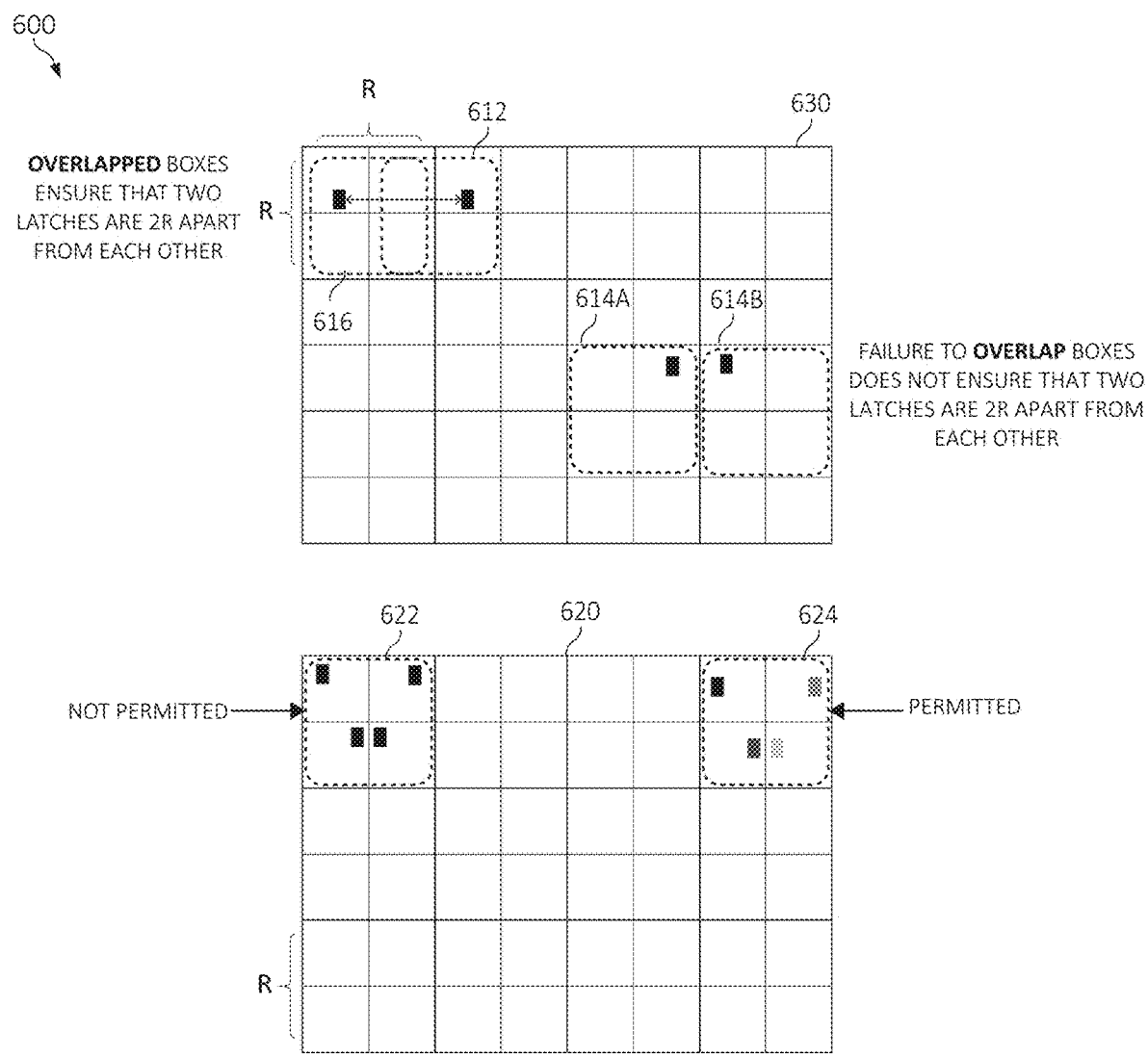
FIG. 6 is a block diagram depicting additional operations for providing enhanced location-aware protection of latches based on assigning latches to boundary boxes according to boundary rules in a computing environment according to an embodiment of the present invention.

For further explanation, FIG. 6 is a block diagram depicting additional operations for providing enhanced location-aware protection of latches based on assigning latches to boundary boxes according to boundary rules in a computing environment. In one aspect, one or more of the components, modules, services, applications, and/or functions described in FIGS. 1-5 may be used in FIG. 6. As will be seen, many of the functional blocks may also be considered "modules" of functionality, in the same descriptive sense as has been previously described in FIGS. 1-5. Repetitive description of like elements employed in other embodiments described herein is omitted for sake of brevity.

As depicted in FIG. 6, a set of latches may be identified in each ECC word using the interleaving method using a 2D template 630 (e.g., the 2D template 530 of FIG. 5). In some implementations, the 2D template 630 of bounding boxes may be placed over one or more existing latches on the current chip layout such as, for example, bounding boxes 612, 616, 622, and 624.

Multiple Latches may be to be combined and protected with ECC such as, for example, latches in bounding boxes 612 and 616. A bounding box rule is applied such that no two latches in the same ECC word may be present in the same R×R bounding box. The bounding box rule ensures that any pair of latches that belong to the same single-bit correcting ECC word, are physically separated by at least 2r distance, and therefore a single particle strike with a strike radius of r cannot erroneously flip both latches. For example, latches in boxes 612 and 616 do not share the same bounding box, therefore physically separated by a minimum of least 2r. Accordingly, those two latches may be combined and protected with a single ECC word. Whereas the 4 latches sharing the bounding box 622 are not permitted to be protected with a single ECC word. In another example, 4 latches sharing the bounding box 624 must be protected each with 4 different ECC words, as the gray shading of the latches in FIG. 6 implies.

Each ECC word may comprise of any number of latches (e.g., 4 to 128), and the placement tool (e.g., the enhanced latches protection service 410) may optimize the bounding box. Using an ECC interleaving operation in 2D (X and Y coordinates), i.e., using a different ECC word for each latch sharing a bounding box, ensures that a high energy particle strike cannot flip two or more latches in the same ECC word. Since physically adjacent and erroneously flipped multiple latches are in different ECC words, each flipped bit appears as a single-bit error to its respective ECC word and therefore may be corrected successfully. It should be noted that the 2D template 630 is considered at every R/2 offset (meaning boxes are overlapped), as depicted with R×R bounding box 612 and R×R bounding box 616. The R×R bounding box 614A and R×R bounding box 614B are shown as not being overlapped and result in a violation of the boundary box rule. Because, as the example illustrates, when the bounding box rule is violated, the two latches in 614A and 614B having less than 2r distance amongst may be placed in the same ECC word, and therefore they are susceptible to a single particle strike.

Also, functionally separate latches may be combined but placed according to a bounding rule that no two latches in the same ECC word may share an R×R bounding box. For example, FIG. 6 depicts R×R bounding box 622 as violating the bounding box rule (e.g., not permitted), because the latches are in the same ECC word as the shading implies, therefore making them susceptible to a single high energy particle strike; while R×R bounding box 624 is permitted per the bounding box rule because each of the 4 latches in 624 are placed in 4 different ECC words, as the shading of the latches imply. Accordingly, if a single particle strike hits the bounding box 624 and even if all 4 latches erroneously flip, they will each appear as a single-bit error to their respective ECC words, and therefore the four errors can all be corrected successfully.

Figure 7:
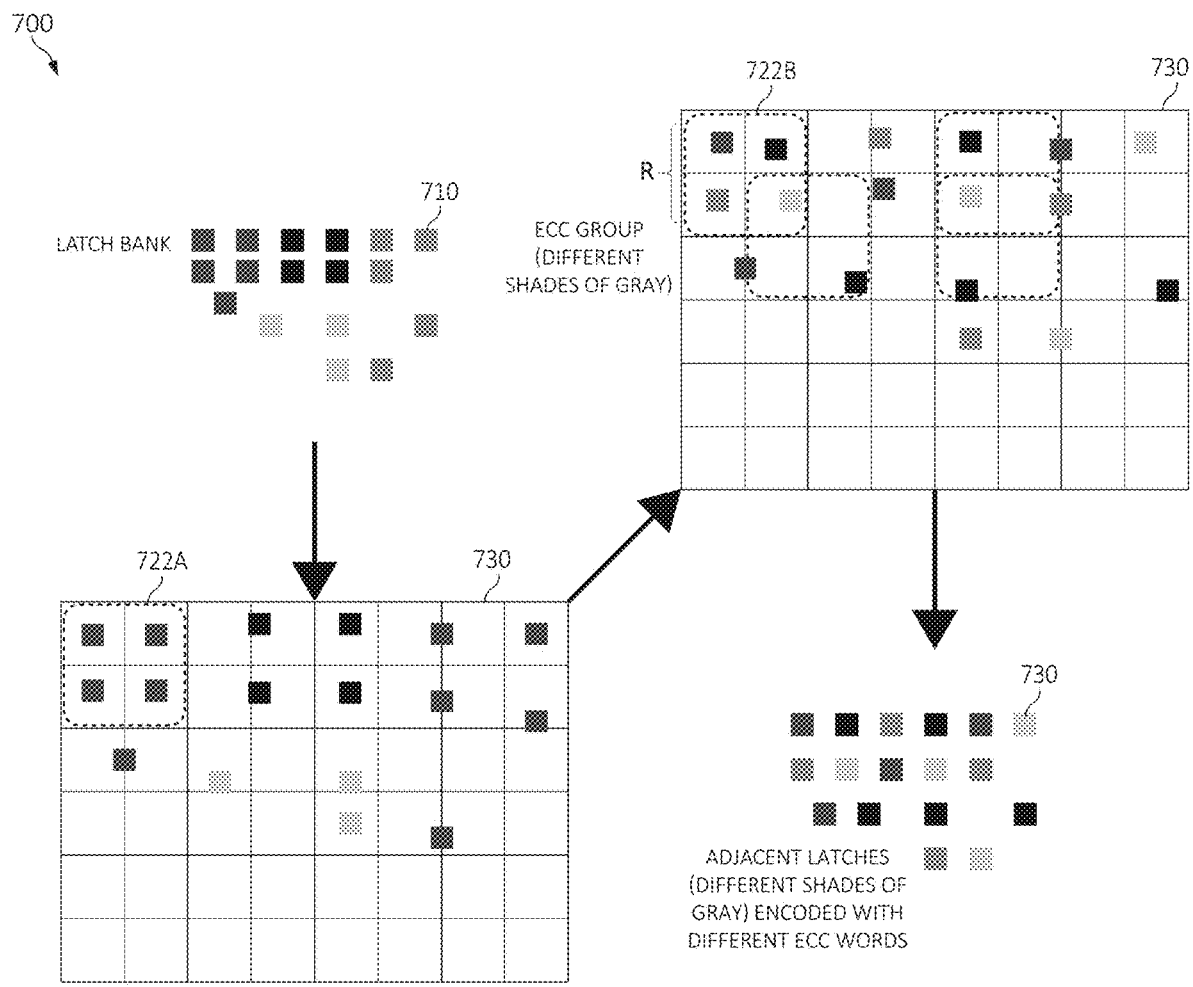
FIG. 7 is a block diagram depicting additional operations for providing enhanced location-aware protection of latches based on assigning latches to boundary boxes according to boundary rules in a computing environment according to an embodiment of the present invention.

For further explanation, FIG. 7 is a block diagram depicting additional operations for providing enhanced location-aware protection of latches based on assigning latches to boundary boxes according to boundary rules in a computing environment according to an embodiment of the present invention. In one aspect, one or more of the components, modules, services, applications, and/or functions described in FIGS. 1-6 may be used in FIG. 7. As will be seen, many of the functional blocks may also be considered "modules" of functionality, in the same descriptive sense as has been previously described in FIGS. 1-6. Repetitive description of like elements employed in other embodiments described herein is omitted for sake of brevity.

As depicted, for combining one or more latches in one or more of a plurality of bounding boxes on a circuit design layout based on one or more rules, no two latches in the same ECC word may share an R×R bounding box (e.g., applying the Interleaving concept). As depicted, however, the latches in the same R×R bounding box (e.g., 722A-B) may assigned similar colors, numbers, or some other identifier where each identifier (e.g., a color) corresponds to one ECC word. Also, there are no restriction on number of identifiers (e.g., colors) per ECC word.

To illustrate, consider the following operations. Consider a latch bank 710 (e.g., a cloud of latches) that are initially placed by a place and route tool into R×R bounding boxes 722A) of a 2D template 730. However, one or more latches are to be placed in one or more of a plurality of bounding boxes on a circuit design layout based on the bounding box rules. Thus, the latches of the latch bank 710 that are placed into the R×R bounding boxes 722A-B are now assigned an identifier (e.g., the latches are colored such as, for example, black, dark gray, or light gray) so as not to violate the boundary rule. For example, the boundary rule requires that there are no similar pairs having the same identifier (e.g., the same color pair) found in a single R×R bounding box. It should be noted that functionally separate group of latches may initially start with one identifier (e.g., color) per group.

Thus, as depicted in the latch bank 730, latches with the same identifier (e.g., same color latches) may be encoded with the same ECC word. For example, latches with a same first identifier (e.g., black colored latches) have separate ECC check bits while latches with a same second identifier (e.g., light gray colored latches) have separate ECC check bits.

Assigning an identifier (e.g., coloring of the latches) can also be performed for parity only (e.g., detection only). However, the ECC may be performed for both detection and correction. In some examples, multiple but a limited number of latches that are "hardened" against soft errors by increasing the transistor sizes of the latch devices may be permitted to be placed in the same bounding box.

In some implementations, more bits in the ECC word implies a higher area efficiency, but longer ECC arithmetic delay. The delay may be a log 2 of the word width such as, for example, 8-bit for 3-gate delays and 64-bit for 6-gate delays. The design tool (e.g., the enhanced latches protection service 410) can decide a width and depth of the ECC word per place and route constraints. The placement tool (e.g., the enhanced latches protection service 410) can start with a nominal number of checkbits bits and place them together then iteratively change the span of the ECC word and select between 8, 16, or 32 bits protected. It should be noted that this process may also be applied to static random-access memory ("SRAMs" in one dimension ("1D"), e.g., every other bit (or 3rd bit etc.) placed in a separate ECC word.

Also, for combining functionally separate set of latches, and clock gating, two or more functionally separate group of latches (e.g., A [0 . . . n], B [0 . . . m]) may be combined and a single set of ECC checkbits is generated out of functionally separate group of latches. The design tool (e.g., the enhanced latches protection service 410) may add these checkbits unbeknownst to the logic designer. The area/count overhead of ECC checkbit latches may be minimized. For example, if there are many finite state machines (FSM), each with 3-4 latches, the multiple FSM's latches may be treated as one set of latches to create a large ECC word.

Figure 8:
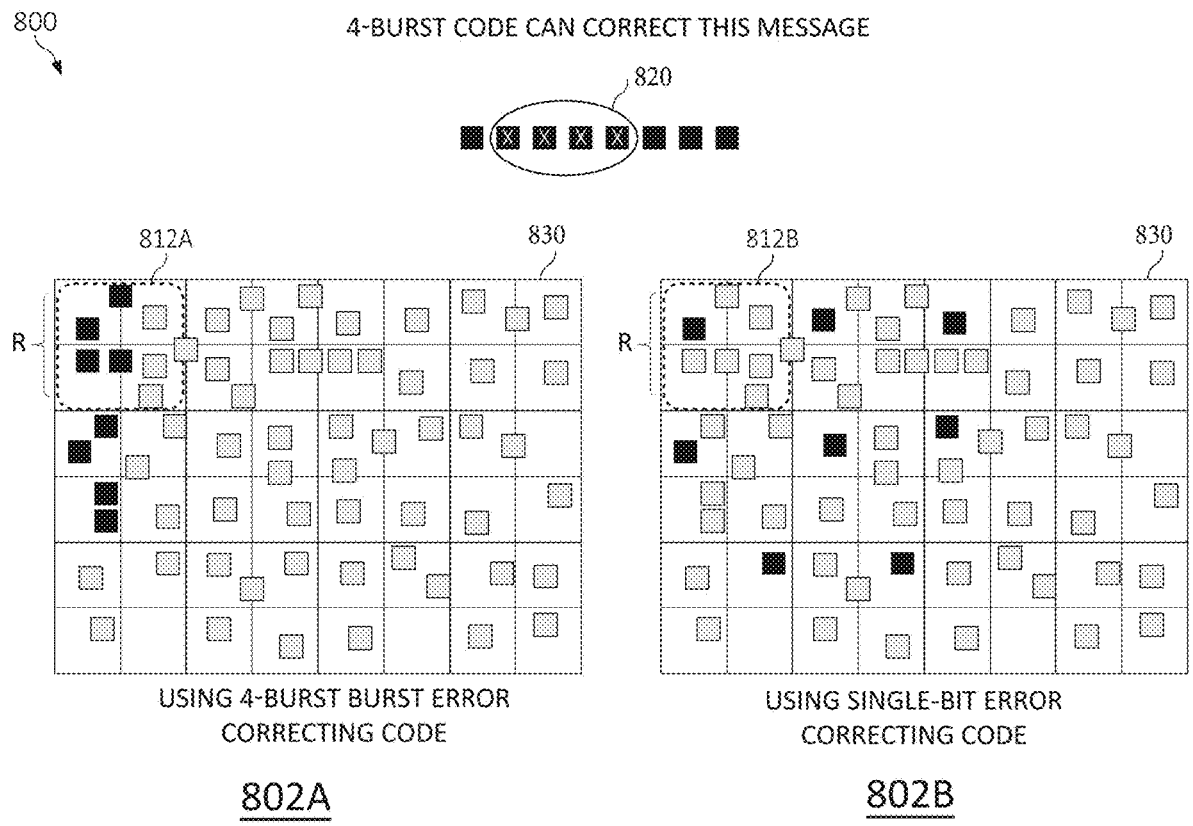
FIG. 8 is a block diagram depicting additional operations for providing enhanced location-aware protection of latches based on burst error correction codes according to boundary rules in a computing environment according to an embodiment of the present invention.

The benefit is for physically close, but functionally separate set of latches. Combining the functionally separate set of latches may be performed as long the group of latches are driven by the same clock For further explanation, FIG. 8 is a block diagram depicting additional operations for providing enhanced location-aware protection of latches based on burst error correction (BEC) codes according to boundary rules in a computing environment according to an embodiment of the present invention. In one aspect, one or more of the components, modules, services, applications, and/or functions described in FIGS. 1-6 may be used in FIG. 7. As will be seen, many of the functional blocks may also be considered "modules" of functionality, in the same descriptive sense as has been previously described in FIGS. 1-6. Repetitive description of like elements employed in other embodiments described herein is omitted for sake of brevity.

In some implementations, the present invention may selectively apply a burst error correction (BEC) code, as illustrated in example 802A, to one or more latches in those of the plurality of bounding boxes where multiple bit errors are corrected. Example 802B is depicted using the location-aware interleaved ECC codes.

In some implementations, the BEC codes are used as transmission codes in communication circuitry. Multiple consecutive errors (burst of errors) in a message transmission may be corrected with a BEC code. For example, a 4-burst BEC code can correct 4 adjacent errors in a message transmission, errors depicted by "X"s in 820. In the present invention, BEC codes are advantageously applied in two dimensions to the R×R bounding boxes such as, for example, R×R bounding boxes 812A such that up to 4 latches may share the same 4-burst BEC code because the BEC code permits correction of up to 4 adjacent errors. In the present invention, each R×R bounding box such as 812A receives no more than N latches of the same identifier (e.g., color), when using an N-burst BEC code. The benefit of BEC compared to Interleaving with SECDED may be higher circuit efficiency and shorter physical distance when grouping latches for ECC. For example, as depicted by 812A and 812B, the latches using the BEC code 812A can be physically nearby, whereas the latches using the single-bit ECC code 812B must be physically distant because only one latch per bounding box is permitted.

It should be noted that in example 802A of the 2D template 830, a 4-burst BEC code is used with no more than 4 latches of the same identifier (e.g., same color) in the R×R bounding boxes 812A. In example 802B of the 2D template 830, a SECDEC code with interleaving may be used rather than BEC, but the one latch per box boundary rule is enforced. Thus, in example 802B, the latches must be physically further apart compared to BEC on the left in example 802A.

Figure 9:
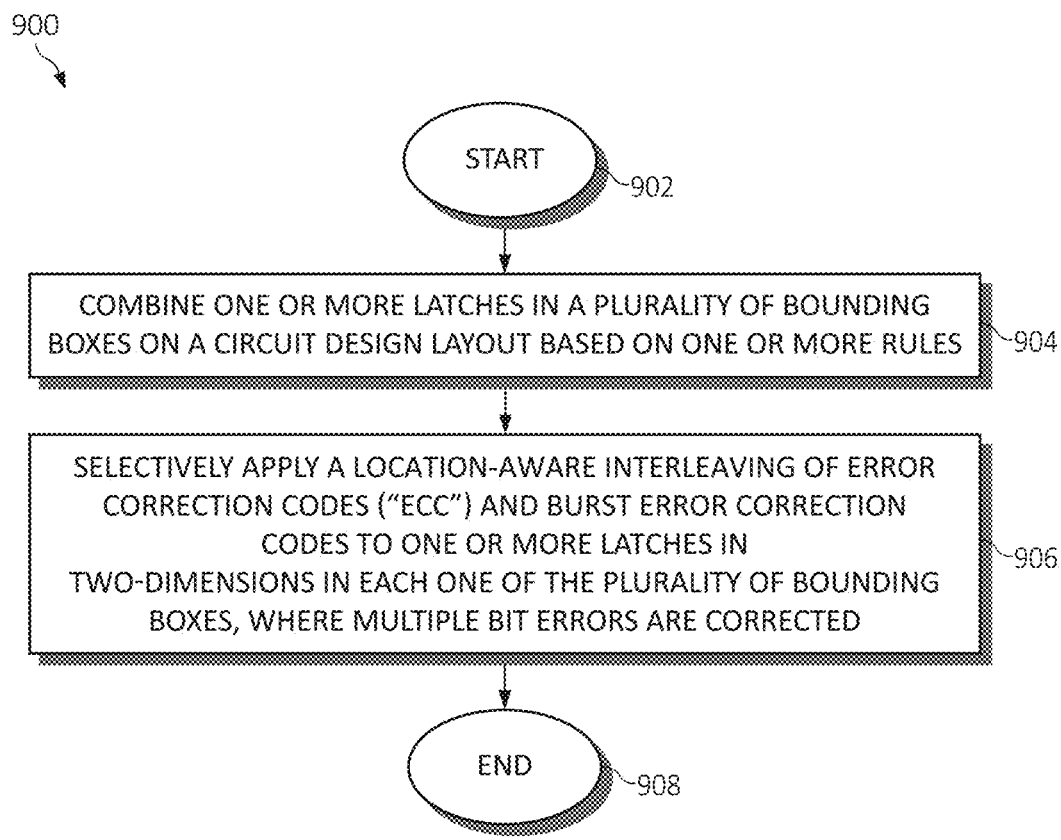
FIG. 9 is a flowchart diagram depicting an additional exemplary method for providing enhanced location-aware protection of latches in a computing environment according to an embodiment of the present invention.

Turning now to FIG. 9, a method 900 for providing enhanced location-aware protection of latches in a computing environment using a processor is depicted, in which various aspects of the illustrated embodiments may be implemented. The functionality 900 may be implemented as a method (e.g., a computer-implemented method) executed as instructions on a machine, where the instructions are included on at least one computer readable medium or one non-transitory machine-readable storage medium. The functionality 900 may start in block 1002.

One or more latches may be combined in one or more of a plurality of bounding boxes on a circuit design layout based on one or more rules, as in block 904. A location-aware interleaving of error correction codes ("ECC") and burst error correction codes may be selectively applied to one or more latches in those of the plurality of bounding boxes, where multiple bit errors are corrected, as in block 906. The functionality 900 may end, as in block 908.

In one aspect, in conjunction with and/or as part of at least one blocks of FIG. 9, the operations of method 900 may include each of the following. The operations of method 900 may apply a two-dimensional ("2D") template having the plurality of bounding boxes to the circuit design layout having the one or more latches. The operations of method 900 may identify a maximum particle strike radius for each of the plurality of bounding boxes. The operations of method 900 may identify a set of latches in each ECC word based on the location-aware interleaving. The operations of method 900 may prevent the one or more latches from sharing a same boundary box of the plurality of bounding boxes based on the location-aware interleaving. The operations of method 900 may combine a set of functionally different latches having a similar clock sequence. The operations of method 900 may overlap one or more boundary boxes of the plurality of bounding boxes with one or more alternative boundary boxes of the plurality of bounding boxes, wherein overlapped boundary boxes ensure at least two latches are at least two boundary boxes apart.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing enhanced location-aware protection of memory register latches in a computing environment by one or more processors comprising:
   combining one or more latches in one or more of a plurality of bounding boxes on a circuit design layout based on one or more rules; and
   selectively applying a location-aware interleaving of error correction codes ("ECC") and burst error correction codes ("BEC") to one or more latches in those of the plurality of bounding boxes, wherein multiple bit errors are corrected.

2. The method of claim 1, further including applying a two-dimensional ("2D") template having the plurality of bounding boxes to the circuit design layout having one or more latches.

3. The method of claim 1, further including identifying a maximum high energy particle strike radius for each of the plurality of bounding boxes.

4. The method of claim 1, further including identifying a set of latches in each ECC word based on the location-aware interleaving.

5. The method of claim 1, further including preventing one or more latches in each ECC word from sharing a same boundary box of the plurality of bounding boxes based on the location-aware interleaving.

6. The method of claim 1, further including combining a set of functionally separate latches having a similar clock sequence.

7. The method of claim 1, further including overlapping one or more boundary boxes of the plurality of bounding boxes with one or more alternative boundary boxes of the plurality of bounding boxes, wherein overlapped boundary boxes ensure any two latches are at least two boundary boxes apart.

8. A system for providing enhanced location-aware protection of memory register latches in a computing environment, comprising:
   one or more computers with executable instructions that when executed cause the system to:
      combine one or more latches in one or more of a plurality of bounding boxes on a circuit design layout based on one or more rules; and
      selectively apply a location-aware interleaving of error correction codes ("ECC") and burst error correction codes ("BEC") to one or more latches in those of the plurality of bounding boxes, wherein multiple bit errors are corrected.

9. The system of claim 8, wherein the executable instructions when executed cause the system to apply a two-dimensional ("2D") template having the plurality of bounding boxes to the circuit design layout having the one or more latches.

10. The system of claim 8, wherein the executable instructions when executed cause the system to identify a maximum high energy particle strike radius for each of the plurality of bounding boxes.

11. The system of claim 8, wherein the executable instructions when executed cause the system to identify a set of latches in each ECC word based on the location-aware interleaving.

12. The system of claim 8, wherein the executable instructions when executed cause the system to prevent one or more latches from sharing a same boundary box of the plurality of bounding boxes based on the location-aware interleaving.

13. The system of claim 8, wherein the executable instructions when executed cause the system to combine a set of functionally separate latches having a similar clock sequence.

14. The system of claim 8, wherein the executable instructions when executed cause the system to overlap one or more boundary boxes of the plurality of bounding boxes with one or more alternative boundary boxes of the plurality of bounding boxes, wherein overlapped boundary boxes ensure any two latches are at least two boundary boxes apart.

15. A computer program product for providing enhanced location-aware protection of memory register latches in a computing environment, the computer program product comprising:
   one or more computer readable storage media, and program instructions collectively stored on the one or more computer readable storage media, the program instruction comprising:
   program instructions to combine one or more latches in one or more of a plurality of bounding boxes on a circuit design layout based on one or more rules; and
   program instructions to selectively apply a location-aware interleaving of error correction codes ("ECC") and burst error correction codes ("BEC") to one or more latches in those of the plurality of bounding boxes, wherein multiple bit errors are corrected.

16. The computer program product of claim 15, further including program instructions to apply a two-dimensional ("2D") template having the plurality of bounding boxes to the circuit design layout having the one or more latches.

17. The computer program product of claim 15, further including program instructions to:
   identify a maximum high energy particle strike radius for each of the plurality of bounding boxes; and
   identify a set of latches in each ECC word based on the location-aware interleaving.

18. The computer program product of claim 15, further including program instructions to prevent the one or more latches from sharing a same boundary box of the plurality of bounding boxes based on the location-aware interleaving.

19. The computer program product of claim 15, further including program instructions to combine a set of functionally separate latches having a similar clock sequence.

20. The computer program product of claim 15, further including program instructions to overlap one or more boundary boxes of the plurality of bounding boxes with one or more alternative boundary boxes of the plurality of bounding boxes, wherein overlapped boundary boxes ensure any two latches are at least two boundary boxes apart.

* * * * *